Sept. 4, 1951 H. P. KUPIEC 2,567,074
DIFFERENTIAL HYDRAULIC STEERING SYSTEM
Filed Aug. 19, 1948 3 Sheets-Sheet 1
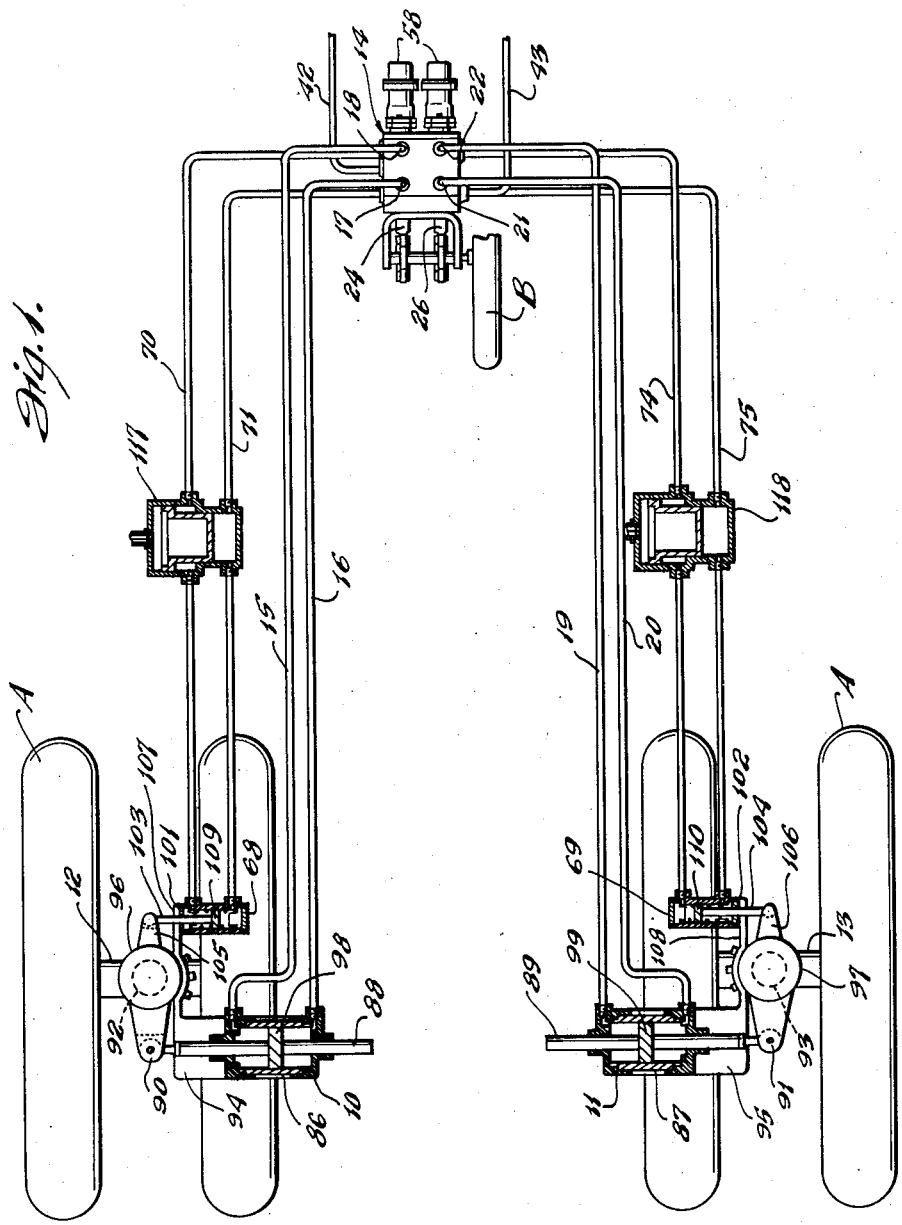
INVENTOR.
HARRY P. KUPIEC
BY
Clark & Ott
ATTORNEYS

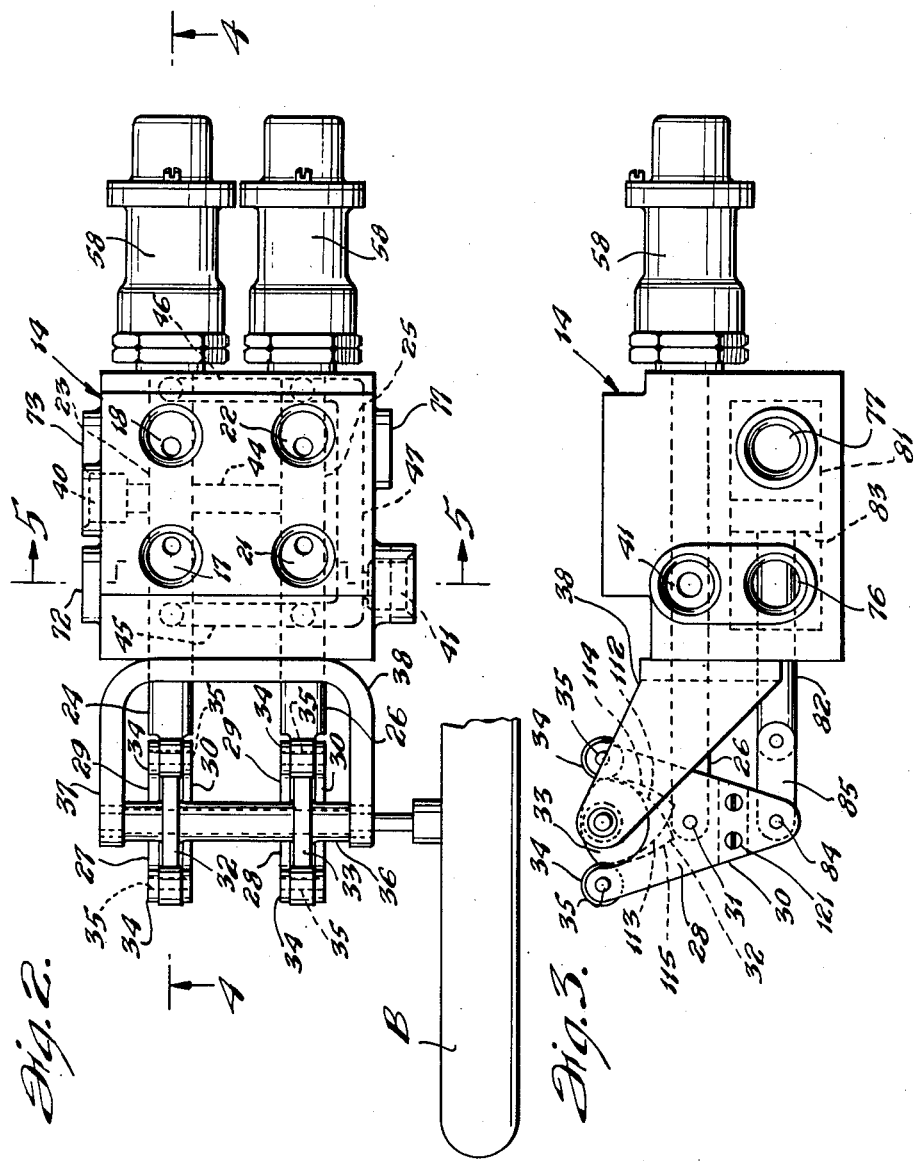

Sept. 4, 1951 H. P. KUPIEC 2,567,074
DIFFERENTIAL HYDRAULIC STEERING SYSTEM
Filed Aug. 19, 1948 3 Sheets-Sheet 3
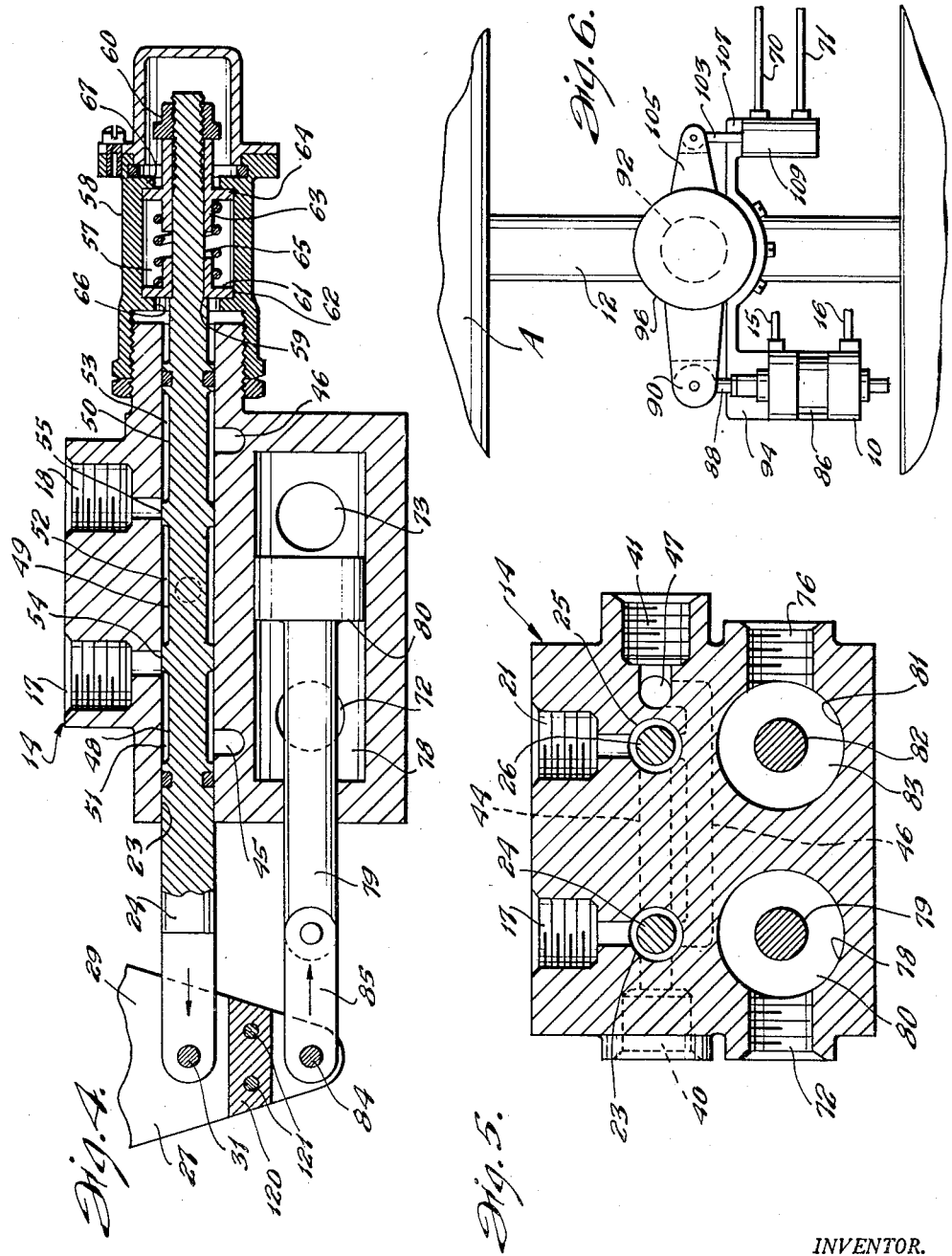
INVENTOR.
HARRY P. KUPIEC
BY
Clark & Ott
ATTORNEYS Patented Sept. 4, 1951

2,567,074

UNITED STATES PATENT OFFICE 2,567,074

DIFFERENTIAL HYDRAULIC STEERING SYSTEM

Harry P. Kupiec, Paramus, N. J., assignor to Air Associates, Incorporated, Teterboro, N. J., a corporation of New Jersey Application August 19, 1948, Serial No. 45,064

7 Claims. (Cl. 180—79.2)

This invention relates to a hydraulic system for turning the guiding wheels of an aircraft to the right or left so as to turn the aircraft when travelling on land.

The invention comprehends a hydraulic system interposed between the steering wheel of an aircraft and the guiding wheels thereof.

Another object of the invention is to provide a hydraulic system having pressure responsive devices operatively connected with the horizontal axles of the guiding wheels of the aircraft which pressure responsive devices are actuated by hydraulic pressure to swing the axles about vertical axes for turning the wheels in unison about said axes.

Still another object of the invention is to provide a hydraulic system in which the pressure responsive device on one side of a turn has greater movement than the pressure responsive device on the other side thereof to thereby impart greater pivotal turning movement to the axle about its axis on one side of the turn than is imparted to the axle on the other side thereof.

Still another object of the invention is to provide a differential hydraulic steering system for turning the guiding wheels of a quadricycle type aircraft landing gear.

Still another object of the invention is the provision of follow-up pressure responsive devices which function in the system through a dual type valve to shut off the flow of hydraulic pressure to the aforesaid hydraulic pressure responsive devices to thereby position the guiding wheels of the aircraft in accordance with the proportionate movement of the steering wheel.

Another object of the invention is to provide a hydraulic steering system which operates on standard hydraulic pressure utilized in aircraft such as 1,000 to 3,000 lbs. per square inch and which relieves the tension on the steering wheel so as to render the same sensitive and easy to turn while eliminating shocks and jars from the guiding wheels being transmitted to the steering wheel.

With the foregoing and other objects in view, reference is now made to the following specification and accompanying drawings in which the preferred form of the parts of the system is illustrated.

In the drawings:

Fig. 1 is a diagrammatic view of a hydraulic system constructed in accordance with the invention and illustrating the parts relatively enlarged with reference to the guiding wheels of a quadricycle type aircraft landing gear.

Fig. 2 is a top plan view of the dual control and follow-up valve.

Fig. 3 is a side view thereof.

Fig. 4 is a longitudinal vertical sectional view taken approximately on line 4—4 of Fig. 2.

Fig. 5 is a horizontal vertical sectional view taken approximately on line 5—5 of Fig. 2.

Fig. 6 is a fragmentary plan view of one of the pairs of wheels A illustrating the position with reference thereto of the two pressure responsive devices operatively connected thereto for turning the axle connecting the wheels.

Referring to the drawings by characters of reference, the system includes hydraulic pressure responsive devices 10 and 11 connected with the horizontal axles 12 and 13 of the forward or guiding wheels A of an aircraft for swinging the axles in unison in either direction to turn the aircraft. The pressure responsive device 10 is connected with a dual control and follow-up valve 14 by means of conduits 15 and 16 connected with the opposite ends thereof and with service ports 17 and 18 opening into said valve. The pressure responsive device 11 is connected with said dual control and follow-up valve 14 by means of conduits 19 and 20 connected with the opposite ends thereof and with service ports 21 and 22 opening into said valve.

The service ports 17 and 18 open into a longitudinally extending bore 23 in which a plunger 24 is mounted for longitudinal reciprocatory movement for regulating the flow of hydraulic fluid in either direction through the conduits 15 and 16 while the service ports 21 and 22 open into a longitudinally extending bore 25 in which a plunger 26 is mounted for longitudinal reciprocatory movement for controlling the flow of hydraulic fluid in either direction through the conduits 19 and 20. The plungers 24 and 26 are disposed in laterally spaced parallel relation and protrude through one end of the valve with the protruding ends thereof pivotally connected to triangular shaped cam followers 27 and 28 respectively. The cam followers 27 and 28 consist of oppositely disposed similar sections 29 and 30 between which the ends of the plungers engage and are pivoted thereto on pivot pins 31 centrally of said cam followers. The said followers have cams 32 and 33 located between the sections 29 and 30 thereof which are engaged on opposite cam faces by cam rollers 34 located between the sections at the upper ends thereof and pivoted thereto on needle bearings 35. The cams 32 and 33 are arranged in fixed longitudinally spaced parallel relation on a shaft 36 which is mounted for turning movement in the side arms 37 of a U-shaped bracket 38 affixed to one end of the valve 14 with the shaft 39 protruding through the bracket and connected with the steering wheel B of the aircraft.

Communicating with the bores 23 and 25 are inlet and outlet openings 40 and 41 respectively constituting fluid pressure supply and return ports which are connected by conduits 42 and 43 leading to a source of fluid pressure (not shown) and to the low pressure side thereof. The fluid pressure port 40 opens into the bore 23 substantially medially of the ends of the valve 14 and extending between said bores in alignment with the fluid pressure port 40 is a transverse passageway 44 for establishing communication between said bores and permitting of the flow of fluid pressure from the fluid port 40 to the bore 25. The return port 41 opens through the valve 14 on the opposite side from the fluid pressure port 40. The valve is also provided with transverse passageways 45 and 46 adjacent the opposite ends thereof which open upwardly into the bores 23 and 25 to permit of the passage of return fluid from the bore 23 to the bore 25. A longitudinally extending passageway 47 is also provided which opens into the return port 41 and at its opposite ends communicates with the passageways 45 and 46 so as to permit of the discharge of the return fluid from the bores through the return port 41.

The plungers 24 and 26 are of similar formation and each is cut away or reduced in diameter at longitudinally spaced portions 48, 49, and 50 to thereby provide circumferentially spaced cylindrical recesses 51, 52, and 53 between said reduced portions and the wall of the bore. Circumferential lands 54 and 55 are thus formed between adjacent reduced portions of said plungers which lands are spaced apart corresponding to the spacing of the service ports 17 and 18, and 21 and 22. The fluid pressure port 40 is in communication with the cylindrical recesses 52 of said bores 23 and 25 while the return port 41 is in communication with the cylindrical recesses 51 and 53 of said bores.

The inner ends of the plungers 24 and 26 are engaged by centering and tensioning devices indicated generally by the reference character 57 which normally retain the plungers with the lands 54 and 55 in partially covering relation with the inner reduced ends of said service ports 17 and 18, and 21 and 22 and which centering and tensioning devices provide stops for limiting the movement of said plungers in opposite directions. The tensioning devices 57 each include a housing 58 secured to the valve 14 with the inner ends of the plungers 24 and 26 projecting into said housings respectively. The inner ends of the plungers 24 and 26 are each reduced in diameter to provide an annular shoulder 59 and have a lock nut 60 affixed to the inner end thereof and between the shoulder 59 and the lock nut 60 is arranged an annular member 61 having a peripheral flange 62 at one end thereof and an annular member 63 having a peripheral flange 64 located substantially medially thereof. The said annular members are spaced apart on the inner ends of the plungers between the shoulders 59 and the lock nuts 60 and have coiled expansion springs 65 surrounding the plungers and tensioned against the peripheral flanges 62 and 64 of said annular members 61 and 63. The housings 58 are formed with inwardly directed annular flanges 66 and 67 against which the outer peripheral portions of the flanges 62 and 63 are normally positioned to retain the plungers 24 and 26 in normal position as hereinbefore set forth.

The system also includes follow-up hydraulic pressure responsive devices 68 and 69 which are connected with the horizontal axles 12 and 13 respectively of the forward or guiding wheels A in oppositely disposed relation from the connection therewith of the pressure responsive devices 10 and 11. The pressure responsive device 68 is connected with said dual control and follow-up valve 14 by means of conduits 70 and 71 connected with the opposite ends thereof and with service ports 72 and 73 opening into said valve. The pressure responsive device 69 is connected with said dual control and follow-up valve 14 by means of conduits 74 and 75 connected with the opposite ends thereof and with service ports 76 and 77 which open into said valve. The service ports 72 and 73 open into a longitudinally extending bore 78 extending longitudinally of and located below the bore 23 and in which bore 78 a follow-up piston rod 79 having an enlarged piston head 80 is mounted for longitudinal reciprocatory movement. The service ports 76 and 77 open into a longitudinally extending bore 81 extending longitudinally of and located below the bore 25 and in which bore 81 a follow-up piston rod 82 having an enlarged piston head 83 is mounted for longitudinal reciprocatory movement.

The follow-up piston rods 79 and 82 are disposed in laterally spaced parallel relation and protrude through the valve 14 below the plungers 24 and 26 respectively. Links 85 are pivotally connected to the outer ends of said rods and extend between the sections 29 and 30 of the cam followers 27 and 28 to which they are pivoted on pivot pins 84 below the pivotal connection of the plungers 24 and 26 therewith respectively.

The pressure responsive devices 10 and 11 consist of cylinders 86 and 87 having reciprocatory rods 88 and 89 pivotally connected to the outer ends of arms 90 and 91 which are affixed at their inner ends to the vertical axles 92 and 93 secured centrally to the horizontal axles 12 and 13 respectively. The cylinders 86 and 87 are respectively affixed by brackets 94 and 95 to the bearing sleeves 96 and 97 secured to the landing gear structure and in which bearing sleeves the upper ends of the vertical axles 92 and 93 are mounted for pivotal turning movement between the pairs of forward or turning wheels A of the aircraft. The reciprocatory rods 88 and 89 have piston heads 98 and 99 respectively which are located substantially centrally of the cylinders 86 and 87 when the wheels A are in longitudinal alignment with the length of the aircraft.

The follow-up pressure responsive devices 68 and 69 consist of cylinders 101 and 102 having reciprocatory rods 103 and 104 pivotally connected to the outer ends of lever arms 105 and 106 respectively which are affixed at their inner ends to the vertical axles 92 and 93 respectively in oppositely disposed relation from the arms 90 and 91. The cylinders 101 and 102 are respectively affixed by brackets 107 and 108 to the bearing sleeves 96 and 97 and the reciprocatory rods 103 and 104 have piston heads 109 and 110 which are located substantially centrally of the said cylinders when the wheels A are in longitudinal alignment with the length of the aircraft.

The follow-up cylinder 68 together with the conduits 70 and 71 and the portion of the bore 78 in which the piston head 80 is mounted for reciprocatory movement constitute a closed circuit for hydraulic fluid which is under pressure against the opposite sides of the piston head 109 in the follow-up cylinder 101 and against the opposite sides of the piston head 80 in the bore 78. Similarly, the follow-up cylinder 69 together with the conduits 74 and 75 and the portion of the bore 81 in which the piston head 83 is mounted for reciprocatory movement constitute a closed circuit for hydraulic fluid which is under pressure against the opposite sides of the piston head 110 in the follow-up cylinder 102 and against the opposite sides of the piston head 83 in the bore 81.

The cams 32 and 33 are oppositely formed, that is the cam face 112 of the cam 32 is similar in formation to the oppositely disposed cam face 113 of the cam 33 while the cam face 114 of the cam 32 is similar in formation to the oppositely disposed cam face 115 of the cam 33. This produces unequal movements of the pistons 24 and 26 and differential turning of the guiding wheels of the aircraft. For instance, when the steering wheel B is turned to the right the unequal movements of the pistons 24 and 26 produces a relatively greater movement to the right of the reciprocatory rod 88 than of the reciprocatory rod 89. This produces a greater turning of the axle 12 on its vertical axle 92 than is imparted to the axle 13 on its vertical axle 93 so as to turn the wheels A on the righthand side through a greater arc about the axle 92 than the arcuate movement about the vertical axle 93 imparted to the wheels on the lefthand side. This differential turning movement of the wheels about the vertical axes of their respective axles produces a greater turning of the wheels of the aircraft which travel through the inner periphery of a turn. In similar manner when turning the steering wheel B to the left the guiding wheels on the lefthand side will be moved through a greater arc about the vertical axle 93 than is imparted to the wheels on the righthand side through the vertical axle 92 as the wheels on the lefthand side travel through the inner periphery of the turn.

In making a turn to the right, the steering wheel B is turned toward the right of the operator and this movement turns the cams 32 and 33 so that the cam followers 27 and 28 will swing outwardly or away from the valve 14 to thereby move the plungers 24 and 26 outwardly, the plunger 24 being moved slightly farther than the plunger 26. This movement of the plungers admits hydraulic fluid under pressure to the service ports 17 and 21 and thence through the conduits 16 and 20 to the lefthand end of the cylinders 86 and 87 so as to move the reciprocatory rods 88 and 89 to the right, the reciprocatory rod 88 being moved a greater distance than the reciprocatory rod 89 to effect a greater turning of the wheels A on the righthand side about the vertical axle 92 than is imparted to the wheels A on the lefthand side about the vertical axle 93. The displacement of the piston heads 98 and 99 to the right forces the hydraulic fluid in the righthand ends of the cylinders 86 and 87 into the conduits 15 and 19 and thence through the service ports 18 and 22 for discharge of the hydraulic fluid displaced through the discharge port 41.

Simultaneously with the movement of the reciprocatory rods 88 and 89 to the right for making a righthand turn as hereinbefore described, the reciprocatory rods 103 and 104 will be moved to the left since the same are pivotally connected to the lever arms 105 and 106 located in oppositely disposed relation from the pivotal connection of the reciprocatory rods 88 and 89 with the lever arms 90 and 91. This movement of the reciprocatory rods 103 and 104 to the left forces hydraulic fluid into the conduits 71 and 75 and against the piston heads 80 and 83 to thereby move the piston rods 79 and 82 inwardly or in a direction opposite to the outward movement of the plungers 24 and 26. This swings the lower portions of the cam followers 27 and 28 inwardly so as to reverse the outward movement of the plungers 24 and 26 and to move the same inwardly to thereby shut off the flow of hydraulic fluid through the service ports 17 and 21. The shutting off of the flow of hydraulic fluid to the pressure responsive devices 10 and 11 discontinues the movement of the reciprocatory rods 88 and 89 thereof and retains the wheels A in the angular position set by the movement imparted to the axles about their vertical axes respectively.

When making a turn to the left, the steering wheel B is turned toward the left of the operator which movement turns the cams 32 and 33 so that the cam followers 27 and 28 are swung inwardly about the pivot pins 34 as the centers to thereby move the plungers 24 and 26 inwardly. This movement of the plungers opens the service ports 18 and 22 and admits hydraulic fluid under pressure through the conduits 15 and 19 to the right-hand ends of the cylinders 86 and 87 of the pressure responsive devices 10 and 11 to thereby move the rods 88 and 89 thereof to the left. Since the plunger 26 will be moved inwardly farther than the plunger 24, the reciprocatory rod 89 will be moved a greater distance to the left than the reciprocatory rod 88 to thereby effect a greater turning of the wheels on the left-hand side about the vertical axle 93 than is imparted to the wheels on the right-hand side about the vertical axle 92. The aforesaid movement of the reciprocatory rods 88 and 89 to the left produces a movement of the reciprocatory rods 103 and 104 of the pressure responsive devices 68 and 69 to the left. This produces a pressure of the hydraulic fluid against the piston heads 80 and 83 to thereby move the piston rods 79 and 82 outwardly or in a direction opposite the aforesaid inward movement of the plungers 24 and 26. The cam followers 27 and 28 are thereby swung outwardly to move the plungers 24 and 26 outwardly so as to shut off or close the service ports 18 and 22. The shutting off of these ports discontinues the flow of hydraulic fluid to the pressure responsive devices 10 and 11 so as to discontinue the movement of the reciprocatory rods 88 and 89 whereby the wheels A are set in the angular position imparted to the axles about the vertical axes respectively. It being understood that the differential movement of the reciprocatory rods imparts to the wheels on the inside of the turn greater angular movement about the vertical axis 93 than is imparted to the wheels on the outside of the turn about the vertical axis 92.

The aforesaid movements of the plungers 24 and 26 when making a right or left-hand turn compresses or tensions the springs 65 of the centering and tensioning devices 57 to thereby maintain the cam followers 27 and 28 in engagement with the cams 32 and 33 and functions to assist in returning the said plungers to the normal position closing the service ports when the follow-up piston rods 79 and 82 are moved to swing the cam followers 27 and 28.

The hydraulic system for operating the hydraulic pressure responsive devices 10 and 11 is adapted to utilize the standard hydraulic pressures in aircraft such as 1,000 to 3,000 pounds per square inch while the pressure of the hydraulic fluid in the return port 41 and return line 43 is approximately 150 pounds per square inch. The closed hydraulic circuits including the follow-up cylinders 68 and 69 and the conduits 70 and 71, and 74 and 75 together with the bores 78 and 79 utilize hydraulic pressure of approximately 200 pounds per square inch and these circuits are provided with pressurizers 117 and 118 respectively for maintaining the aforesaid pressure therein.

The sections 29 and 30 of the cam followers 27 and 28 are secured in spaced parallel relation by means of spacer members 120 arranged between the sections and to which the sections are secured by means of screws 121.

What is claimed is:

1. In a hydraulic system for turning the guiding wheels of an aircraft landing gear to turn the aircraft when travelling on land, pressure responsive devices operatively connected with the horizontal axles of the guiding wheels for turning the axles about upwardly extending axes respectively, a valve having two chambers, conduits connecting said valve with the pressure responsive devices, two plungers mounted for reciprocatory movement in said valve chambers respectively for controlling the flow of hydraulic fluid through said valve, a steering member for the aircraft, means operatively connected with the steering member and with said plungers for imparting greater linear movement to one of said plungers than the other when the steering member is moved to thereby open said valve for the flow of hydraulic fluid to said pressure responsive devices to impart a greater movement to one of the axles than to the other about their upwardly extending axes respectively.

2. In a hydraulic system for turning the guiding wheels of an aircraft to turn the aircraft when travelling on land, pressure responsive devices operatively connected with the horizontal axles of the guiding wheels for turning the axles about upwardly extending axes respectively, a valve having two chambers, conduits connecting said valve with the opposite ends of said pressure responsive devices for permitting of the flow of hydraulic fluid to and from said devices, two plungers mounted for reciprocatory movement in said valve chambers respectively for controlling the flow of hydraulic fluid through said valve, a steering member for the aircraft, cam followers pivotally connected with said plungers respectively, cams operatively connected with the steering member and each of said cams having dissimilar cam faces on opposite sides thereof with the cam faces of one of said cams being reversely arranged with reference to the cam faces of the other cam, and said cam faces engaging said cam followers for imparting greater linear movement to one of said plungers than the other to thereby open said valve for the flow of hydraulic fluid to said pressure responsive devices to impart a greater turning movement to one of said axles than the other about their upwardly extending axes respectively.

3. In a hydraulic system for turning the guiding wheels of an aircraft to turn the aircraft when travelling on land, pressure responsive devices operatively connected with the horizontal axles of the guiding wheels for turning the axles about upwardly extending axes respectively, a valve having two chambers, conduits connecting said valve with the opposite ends of said pressure responsive devices for permitting of the flow of hydraulic fluid to and from said devices, two plungers mounted for reciprocatory movement in said valve chambers respectively for controlling the flow of hydraulic fluid through said valve, a steering member for the aircraft, cams operatively connected with the steering member to turn therewith, and cam followers pivotally connected with said plungers respectively and engaged by said cams for imparting movement to said plungers for opening said valve for the flow of hydraulic fluid to actuate said pressure responsive devices to turn the axles of the wheels about their upwardly extending axes respectively.

4. In a hydraulic system for turning the guiding wheels of an aircraft to turn the aircraft when traveling on land, pressure responsive devices operatively connected with the horizontal axles of the wheels to turn said axles on upwardly extending axes respectively, follow-up pressure responsive devices operatively connected with the horizontal axles of the wheels for actuation by the movement of the axles respectively, a valve having two chambers, two plungers mounted for reciprocatory movement in said valve chambers respectively for regulating the flow of hydraulic fluid to said pressure responsive devices, a steering member for said aircraft, means operatively connected with the steering member and with said plungers to move said plungers for opening the valve for the flow of hydraulic fluid to said pressure responsive devices to actuate the same for turning the axles about their upwardly extending axes respectively, said valve also having two auxiliary chambers, and two follow-up pistons mounted for movement in said auxiliary valve chambers respectively for shutting off the flow of hydraulic fluid to thereby discontinue the turning of the axles.

5. In a hydraulic system for turning the guiding wheels of an aircraft to turn the aircraft when travelling on land, pressure responsive devices operatively connected with the horizontal axles of the guiding wheels for turning the axles about upwardly extending axes respectively, a valve having two chambers, conduits connecting said valve with the opposite ends of said pressure responsive devices for permitting of the flow of hydraulic fluid to and from said devices, two plungers mounted for reciprocatory movement in said valve chambers respectively, a steering member for said aircraft, cams operatively connected with the steering member to turn therewith, cam followers pivotally connected with said plungers respectively and engaged by said cams for imparting movement to said plungers for opening said valve for the flow of hydraulic fluid to actuate said pressure responsive devices, follow-up pressure responsive devices operatively connected with the horizontal axles of the wheels for actuation of said devices by the movement of the axles respectively, said valve also having two auxiliary chambers, conduits connecting said follow-up pressure responsive devices with said valve to provide closed hydraulic fluid circuits in which hydraulic fluid is caused to flow by the actuation of said follow-up pressure responsive devices, and two follow-up pistons mounted for movement in said auxiliary chambers respectively and pivotally connected with said cam followers respectively to thereby move said plungers to shut off the flow of hydraulic fluid to said pressure responsive devices to discontinue the turning of the axles.

6. In a hydraulic system for turning the guiding wheels of an aircraft to turn the aircraft when travelling on land, pressure responsive devices operatively connected with the horizontal axles of the guiding wheels for turning the axles about vertical axes respectively, a valve having two chambers, conduits connecting said valve with the opposite ends of said pressure responsive devices for permitting of the flow of hydraulic fluid to and from said devices, two plungers mounted for reciprocatory movement in said valve chambers respectively, a steering member for said aircraft, cam followers pivotally connected with said plungers respectively, cams operatively connected with the steering member and each of said cams having dissimilar cam faces on opposite sides thereof with the cam faces of one of said cams being reversely arranged with reference to the cam faces of the other cam, said cam faces engaging said cam followers for imparting greater linear movement to one of said plungers than the other to impart a greater turning movement to one of said axles than the other, follow-up pressure responsive devices operatively connected with the horizontal axles of the wheels for actuation of said devices by the movement of the axles respectively, said valve also having two auxiliary chambers, conduits connecting said follow-up pressure responsive devices with said valve to provide closed hydraulic fluid circuits in which hydraulic fluid is caused to flow by the actuation of said follow-up pressure responsive devices, and two follow-up pistons mounted for movement in said auxiliary chambers respectively and pivotally connected with said cam followers respectively so as to move said plungers to shut off the flow of hydraulic fluid through said valve to said pressure responsive devices to discontinue the turning of the axles.

7. In a hydraulic system for turning the guiding wheels of an aircraft to turn the aircraft when travelling on land, pressure responsive devices including cylinders having pistons pivotally connected with the horizontal axles of the wheels for turning the axles on vertical axes respectively, a valve having two chambers, conduits connecting said valve with the opposite ends of said cylinders, two plungers mounted for reciprocatory movement in said valve chambers respectively for regulating the flow of hydraulic fluid to said cylinders, a steering member for said aircraft, cams operatively connected with the steering member to turn therewith, cam followers pivotally connected with said plungers respectively and engaged by said cams for imparting movement to said plungers for opening said valve for the flow of hydraulic fluid to move said pistons to turn the axles of the wheels about their vertical axes respectively, follow-up pressure responsive devices including cylinders having pistons pivotally connected with the horizontal axles of the wheels for movement of said pistons by the turning of the axles on their vertical axes respectively, said valve also having two auxiliary chambers, conduits connecting said valve with the cylinders of said follow-up pressure responsive devices to provide closed hydraulic circuits in which hydraulic fluid is caused to flow by the movement of the pistons in the cylinders of said follow-up pressure responsive devices, and two follow-up pistons mounted for movement in said auxiliary chambers respectively and pivotally connected with said cam followers respectively so as to swing said cam followers and thereby move said plungers to shut off the flow of hydraulic fluid through said valve to said pressure responsive devices to discontinue the turning of the axles.

HARRY P. KUPIEC.

REFERENCES CITED

The following references are of record in the file of this patent:

UNITED STATES PATENTS

| Number | Name | Date |
| --- | --- | --- |
| 2,252,660 | Kulikoff | Aug. 12, 1941 |